(12) United States Patent
Ferber et al.

(10) Patent No.: US 7,447,115 B2
(45) Date of Patent: Nov. 4, 2008

(54) PROCESSING SEISMIC DATA USING INTERFEROMETRY TECHNIQUES

(75) Inventors: Ralf Ferber, Horsham (GB); Christophe Zaroli, Geispolsheim-Gare (FR)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/567,205

(22) Filed: Dec. 5, 2006

(65) Prior Publication Data

US 2008/0133140 A1 Jun. 5, 2008

(51) Int. Cl.
*G01V 1/36* (2006.01)

(52) U.S. Cl. .......................... 367/52; 702/18

(58) Field of Classification Search ................ 367/52; 702/18
See application file for complete search history.

(56) References Cited

U.S. PATENT DOCUMENTS

| | | | | |
|---|---|---|---|---|
| 4,608,673 | A | | 8/1986 | Lazear |
| 4,887,243 | A | * | 12/1989 | Pann .......................... 367/24 |
| 5,008,861 | A | * | 4/1991 | Gallagher .................... 367/59 |
| 5,097,452 | A | * | 3/1992 | Beasley ....................... 367/53 |
| 5,130,949 | A | * | 7/1992 | Kan et al. .................... 367/27 |
| 5,343,440 | A | * | 8/1994 | Kan et al. .................... 367/27 |
| 5,396,472 | A | | 3/1995 | Paffenholz |
| 5,500,832 | A | * | 3/1996 | Berryhill ..................... 367/51 |
| 5,524,100 | A | | 6/1996 | Paffenholz |
| 5,991,238 | A | | 11/1999 | Barr |
| 6,125,330 | A | | 9/2000 | Robertson et al. |
| 6,289,285 | B1 | * | 9/2001 | Neff et al. .................... 702/16 |
| 6,807,489 | B2 | | 10/2004 | Naville et al. |
| 6,931,362 | B2 | | 8/2005 | Beadle et al. |
| 6,999,880 | B2 | | 2/2006 | Lee |
| 2002/0087272 | A1 | * | 7/2002 | Mackie ........................ 702/14 |
| 2002/0103602 | A1 | | 8/2002 | Meng |
| 2004/0257911 | A1 | * | 12/2004 | Tang et al. .................... 367/81 |
| 2005/0122840 | A1 | * | 6/2005 | Haldorsen .................... 367/57 |

FOREIGN PATENT DOCUMENTS

| | | |
|---|---|---|
| GB | 1 400 044 | 7/1975 |
| GB | 1 447 873 | 9/1976 |
| WO | WO 2006/040521 | 4/2006 |

OTHER PUBLICATIONS

Zhou et al. Comparison between interferometric migration and reduced-time migration of common-depth-point data. Geophyics. vol. 71. No. 4. Jul.-Aug. 2006. pp. SI189-SI196.*

Common Midpoint. Oilfield Glossary. © 2008 Schlumberger Limited. http://www.glossary.oilfield.slb.com/Display.cfm?Term=common%20midpoint.*

(Continued)

*Primary Examiner*—Jack W Keith
*Assistant Examiner*—Ari M Diacou
(74) *Attorney, Agent, or Firm*—Ari Pramudji; Liangang (Mark) Ye; Jeffrey E. Griffin (57) ABSTRACT

Method for processing seismic data. In one implementation, the method includes converting a common midpoint (CMP) gather of seismograms into one or more interferogram common midpoint (ICMP) gathers, generating a semblance spectrum for each ICMP gather, stacking the semblance spectrum from each ICMP gather to generate a combined semblance spectrum and deriving a normal moveout (NMO) velocity profile from the combined semblance spectrum.

15 Claims, 7 Drawing Sheets

OTHER PUBLICATIONS

Schuster, G. T., J. Yu, J. Sheng, and J. Rickett, 2004b, Interferometric/Daylight seismic imaging, Geophysical Journal International, 157, 838-852. http://www3.interscience.wiley.com/cgi-bin/fulltext/118792701/PDFSTART.*

Introduction to the supplement on seismic interferometry Kees Wapenaar, Deyan Draganov, and Johan Robertsson, Geophysics 71, SI1 (2006), DOI:10.1190/1.2352998http://scitation.aip.org/getabs/servlet/GetabsServlet?prog=normal&id=GPYSA7000071000004000SI1000001&idtype=cvips&gifs=yes.*

Liliana Borcea, George Papanicolaou, and Chrysoula Tsogka. Coherent interferometric imaging in clutter. geophysics,vol. 71, No. 4_Jul-Aug. 2006_; P. SI165-SI175, 12 Figs. 10.1190/1.2209541.*

Eric Verschuur and A.J. Berkhout. Linking multiple removal and daylight imaging for regular surface seismic data. Seismic Interferometry, Daylight Imaging and Time Reversal, 2005. Society of Exploration Geophysics Workshop. http://www.geos.ed.ac.uk/homes/acurtis/SEG05/SEG05_Verschuur.pdf.*

Ilana Erez and Luc Ikelle. Bending the wrong way and imaging the right way. Seismic Interferometry, Daylight Imaging and Time Reversal, 2005. Society of Exploration Geophysics Workshop. http://www.geos.ed.ac.uk/homes/acurtis/SEG05/SEG05_Erez.ppt.*

Peter Gerstoft, Karim Sabra, WA Kuperman, Mike Fehler and Phillipe Roux. Extracting Green's functions from ocean acoustic and seismic noise. Seismic Interferometry, Daylight Imaging and Time Reversal, 2005. Society of Exploration Geophysics Workshop. http://www.mpl.ucsd.edu/people/gerstoft/view05/05segposter.pdf.*

Lee and Kim, "Source-independent full-waveform inversion of seismic data," *Geophys.*, 68(6):2010-2015, 2003.

Snieder and Safak, "Extracting the building response using seismic interferometry: Theory and application to the Millikan Library in Pasadena, California," *Bulletin of the Seismological Society of America*, 96(2):586-598, 2006.

Alterman and Karal, "Propagation of elastic waves in layered media by finite-difference methods," *Bulletin of the Seismological Society of America*, 58:367-398, 1968.

Givoli and Cohen, "Nonreflecting boundary conditions based on Kirchhoff-type formulae," *J. Comp. Phys.*, 117:102-113, 1995.

Kelly et al., "Synthetic seismograms: a finite-difference approach," *Geophys.*, 41:2-27, 1976.

Moczo et al., "The finite-difference time-domain method for modeling of seismic wave propagation," *Advances in Geophysics*, 48:421-516, 2007.

Robertsson and Chapman, "An efficient method for calculating finite-difference seismograms after model alterations," *Geophys.*, 65:907-918, 2000.

Robertsson et al., "Viscoelastic finite-difference modeling," *Geophys.*, 59:-1444-1456, 1994.

Teng, "Exact boundary condition for time-dependent wave equation based on boundary integral," *J. Comp. Phys.*, 190:398-418, 2003.

Ting and Miksis, "Exact boundary conditions for scattering problems," *J. Acoust. Soc. Am.*, 80:1825-1827, 1986.

van Manen, Robertsson and Curtis, "Modeling of wave propagation in inhomogeneous media," *phys. Rev. Lett.*, 94:164301, 2005.

* cited by examiner

PROCESSING SEISMIC DATA USING INTERFEROMETRY TECHNIQUES

BACKGROUND

1. Field of the Invention

Implementations of various technologies described herein generally relate to seismic data processing.

2. Description of the Related Art

The following descriptions and examples are not admitted to be prior art by virtue of their inclusion within this section.

In a typical seismic survey, a plurality of seismic sources, such as explosives, vibrators, airguns or the like, may be sequentially activated at or near the surface of the earth to generate energy which may propagate into and through the earth. The seismic waves may be reflected back by geological formations within the earth. The resultant seismic wavefield may be sampled by a plurality of seismic sensors, such as geophones, hydrophones and the like. Each sensor may be configured to acquire seismic data at the sensor's location, normally in the form of a seismogram representing the value of some characteristic of the seismic wavefield against time. A seismogram may also be commonly known as a seismic trace. The acquired seismograms may be transmitted wirelessly or over electrical or optical cables to a recorder system. The recorder system may then store, analyze, and/or transmit the seismograms. This data may be used to detect the possible presence of hydrocarbons, changes in the subsurface and the like.

Seismograms may contain unwanted signals, or noise, as well as the desired seismic reflection signals. Unwanted signals may interfere with the interpretation of the seismic signals and degrade the quality of the subsurface images obtained by processing the recorded seismograms. It may therefore be desirable to suppress or attenuate the unwanted signal that may be present in the recorded seismograms during processing. Various techniques have been developed to process seismograms in an effort to amplify the seismic reflection signals and attenuate the unwanted signals, such as semblance spectrum velocity analysis, normal moveout (NMO) correction, NMO stacking and the like. Other common techniques used to process seismograms include tools to manipulate travel times in seismograms. Deconvolution, also referred to as spectral division, may be one such tool. After deconvolution, the seismic data may be recorded according to travel time difference rather than travel time.

In the field of interferometry, seismograms may be converted into seismic interferograms by deconvolving two seismograms that have been transformed from the time domain into the frequency domain. This process combines the two seismograms into one seismic interferogram that contains the difference between the two seismograms, cancelling out all that may be in common between the seismograms such as unwanted signals.

Typical techniques applied during seismic data processing may not adequately amplify the reflection signal and attenuate the unwanted signal. Accordingly, improved methods for processing seismic data may be desirable. Using interferometry techniques combined with typical seismic data processing techniques may improve various methods for processing seismic data.

SUMMARY

Described herein are implementations of various technologies for a method for processing seismic data. In one implementation, the method includes converting a common midpoint (CMP) gather of seismograms into one or more interferogram common midpoint (ICMP) gathers, generating a semblance spectrum for each ICMP gather, stacking the semblance spectrum from each ICMP gather to generate a combined semblance spectrum and deriving a normal moveout (NMO) velocity profile from the combined semblance spectrum.

In another implementation, the method includes deriving a normal moveout (NMO) velocity profile, converting a common midpoint (CMP) gather of seismograms into one or more interferogram common midpoint (ICMP) gathers, correcting the ICMP gathers using the NMO velocity profile and stacking the NMO corrected ICMP gathers.

Described herein are also implementations of various technologies for a computer system. In one implementation, the system includes a processor and a memory comprising program instructions executable by the processor to: prepare one or more seismograms into a common midpoint (CMP) gather, convert the CMP gather into one or more interferogram common midpoint (ICMP) gathers, generate a semblance spectrum for each ICMP gather, stack a semblance spectra from the one or more ICMP gathers to generate a combined semblance spectrum, derive a normal moveout (NMO) velocity profile from the combined semblance spectrum and generate NMO stacks of seismic data using the NMO velocity profile.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

In general, one or more implementations of various technologies described herein are directed to a method for processing seismic data using seismic interferometry techniques, which are based on traveltime differences. The seismograms may first be sorted into a common midpoint (CMP) gather, which then may be converted to a plurality of interferogram common midpoint (ICMP) gathers. After the conversion, a semblance spectrum may be computed for the ICMP gathers. The semblance spectrum may then be used to derive a normal moveout (NMO) velocity profile, which may then be used to generate NMO stacks using either CMP gathers or ICMP gathers. In one implementation, after the conversion of CMP gathers to ICMP gathers, NMO stacks may be generated from the ICMP gathers without first computing the semblance spectrum in the seismic interferogram domain. Various implementations of the method are described in more detail in the following paragraphs.

Figure 1:
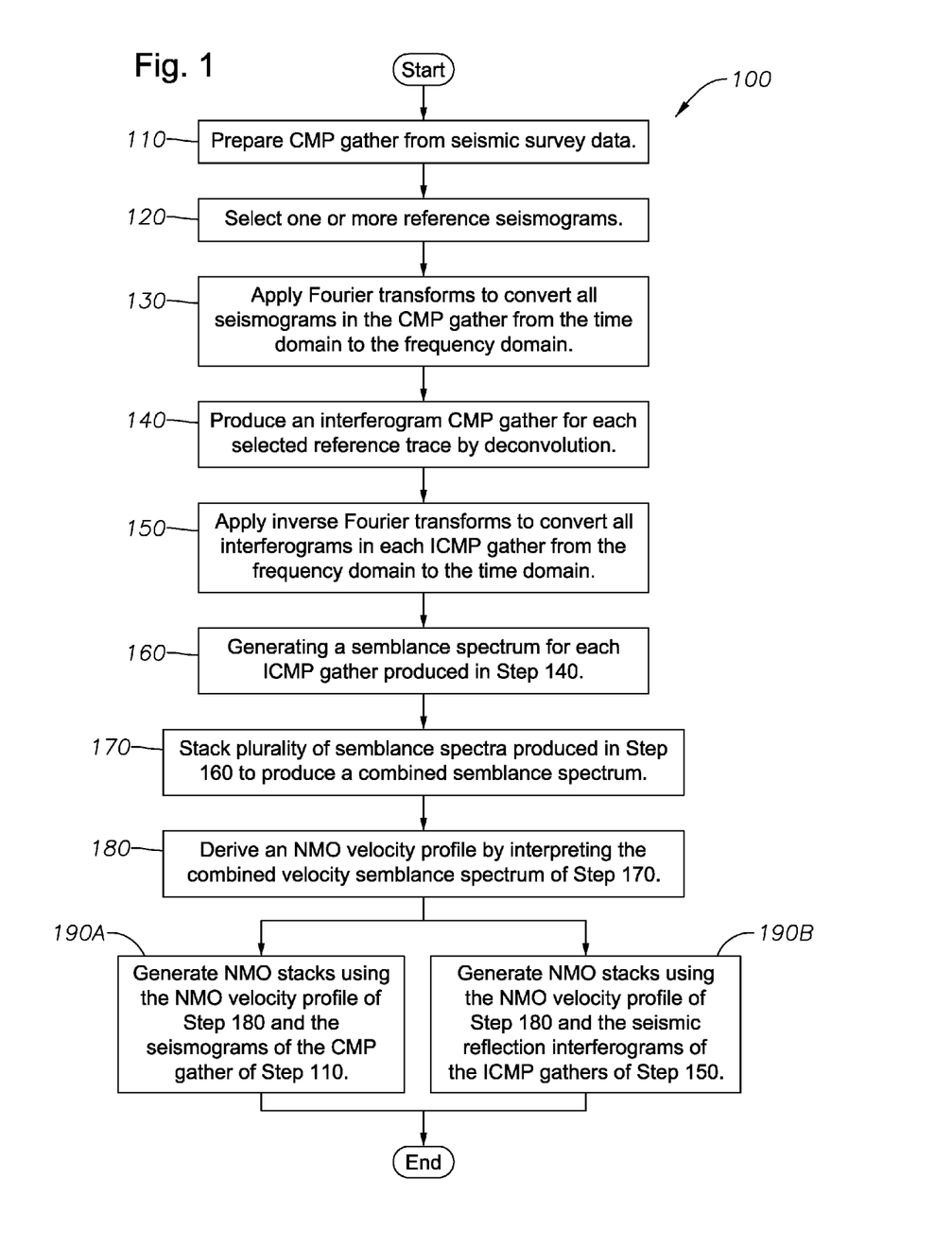
FIG. 1 illustrates a flow diagram of a method to improve the signal-to-noise ratio in NMO stacked seismic data using interferometry in accordance with implementations of various technologies described herein.

FIG. 1 illustrates a flow diagram of a method 100 to improve the signal-to-noise ratio in NMO stacked seismic data using interferometry in accordance with implementations of various technologies described herein. It should be understood that the operations illustrated in the flow diagram of FIG. 1 are not necessarily limited to being performed by method 100. Additionally, it should be understood that while the operational flow diagram indicates a particular order of execution of the operations, in other implementations, the operations might be executed in a different order.

Figure 2A:
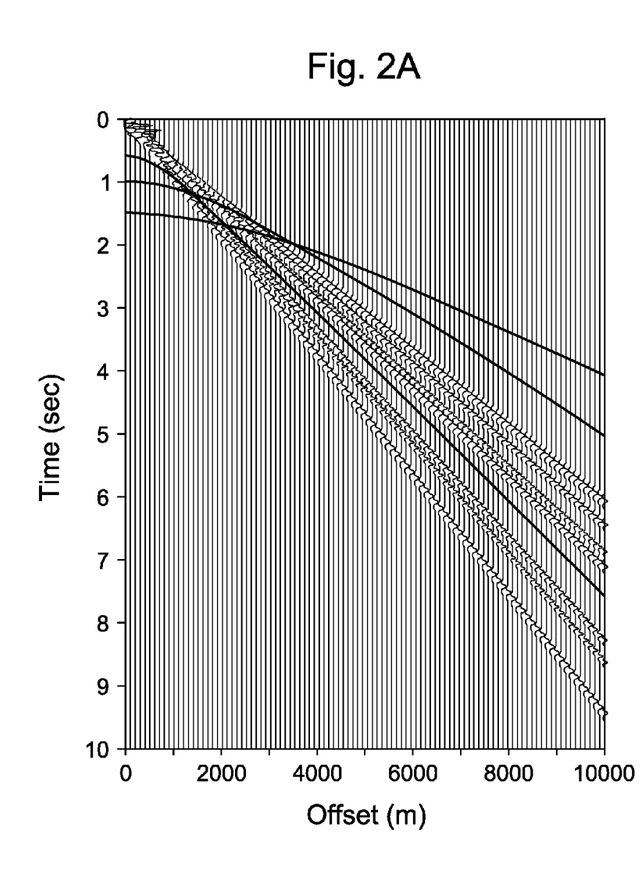
FIGS. 2A-D illustrate semblance spectrum velocity analysis using seismograms and seismic interferograms in accordance with implementations of various technologies described herein.

At step 110, a common midpoint (CMP) gather may be prepared using seismograms from any type of seismic survey, such as land or marine. A CMP is a point on the earth's surface that is equidistant from one or more source and sensor pairs. The CMP on the earth's surface may be directly above a seismic reflection event below the earth's surface. In a typical seismic survey, there may be a plurality of CMPs. During processing, the survey seismograms may be sorted such that seismograms having the same CMP are grouped together. A group of seismograms sharing a CMP is known as a CMP gather. FIG. 2A illustrates a CMP gather where each vertical entry represents a seismogram with an amplitude value at a given time and offset from the CMP. Although various implementations are described herein with reference to a CMP gather, it should be understood that in some implementations, the seismograms may be grouped into other types of gathers, such as common source, common receiver or common offset gathers.

At step 120, one or more of the seismograms in the CMP gather may be selected as reference seismograms. In one implementation, all seismograms in a CMP gather may be selected as reference seismograms. At step 130, each seismogram in the CMP gather may be converted from the time domain to the frequency domain using Fourier transforms.

At step 140, each seismogram of the CMP gather may be deconvolved by each reference seismogram. For example, each seismogram of the CMP gather may be deconvolved by a first reference seismogram. Each deconvolution may generate a seismic interferogram. Hence, for one reference seismogram, as many seismic interferograms may be generated as seismograms in the original CMP gather. All seismic interferograms generated by one reference seismogram may be referred to as an interferogram CMP (ICMP) gather. Next, each seismogram of the original CMP gather may be deconvolved by a second reference seismogram to generate another ICMP gather. Thus, the deconvolution process may yield as many ICMP gathers as selected reference seismograms and as many seismic interferograms in each ICMP gather as seismograms in the original CMP gather.

The mathematical computation performed by deconvolution may cause all common convolution components between each seismogram and the reference seismogram to be eliminated. If the seismograms were collected in close time and proximity, as in a CMP gather, it may be assumed that many unwanted signals may be common components, such as the source wavelet, common near-surface effects on both the source and receiver side, common absorption wavelet, and the like. For example, each seismogram in the frequency domain may be represented by the following equation:

$$x_1(f) = w(f) \cdot r_1(f) \qquad \text{Equation 1.}$$

In Equation 1, w(f) represents the unwanted signals and $r_1(f)$ represents the reflection signal. The reference seismogram may be represented by the following equation:

$$x_{ref}(f) = w(f) \cdot r_{ref}(f) \qquad \text{Equation 2.}$$

In Equation 2, w(f) represents the unwanted signals and $r_{ref}(f)$ represents the reflection signal of the reference seismogram. The seismogram represented by Equation 1 may be deconvolved with the reference seismogram of Equation 2 to form the following equation:

$$\frac{x_1(f)}{x_{ref}(f)} = \frac{w(f)}{w(f)} \cdot \frac{r_1(f)}{r_{ref}(f)}. \qquad \text{Equation 3}$$

Because the common unwanted signals w(f) cancel out of Equation 3, common unwanted signals w(f) may be eliminated via the deconvolution process. Thus, converting seismograms to seismic interferograms may eliminate common unwanted signal and improve the signal-to-noise ratio in the seismic data. It should be noted that the deconvolution process may also be referred to as spectral division. It should also be noted that the deconvolution process may be replaced by a correlation process. In one implementation, the seismic interferograms may be created in a time variant manner, for example using sliding time windows.

At step 150, an inverse Fourier transform may be applied to each seismic interferogram to convert them from the frequency domain back into the time domain. The resulting traveltime information in a seismic interferogram may be a relative traveltime in the form of the difference of the traveltimes of the seismogram and the reference seismogram that were deconvolved to produce it. The traveltime may be relative to the reference seismogram used to calculate the ICMP gather. For example, if an event exists at traveltime $t_a$ in a seismogram and at traveltime $t_{ref}$ in the reference seismogram, the seismic interferogram may have the event at the traveltime difference represented in Equation 4 below.

$$\tau = t_a - t_{ref} \qquad \text{Equation 4}$$

Figure 2B:
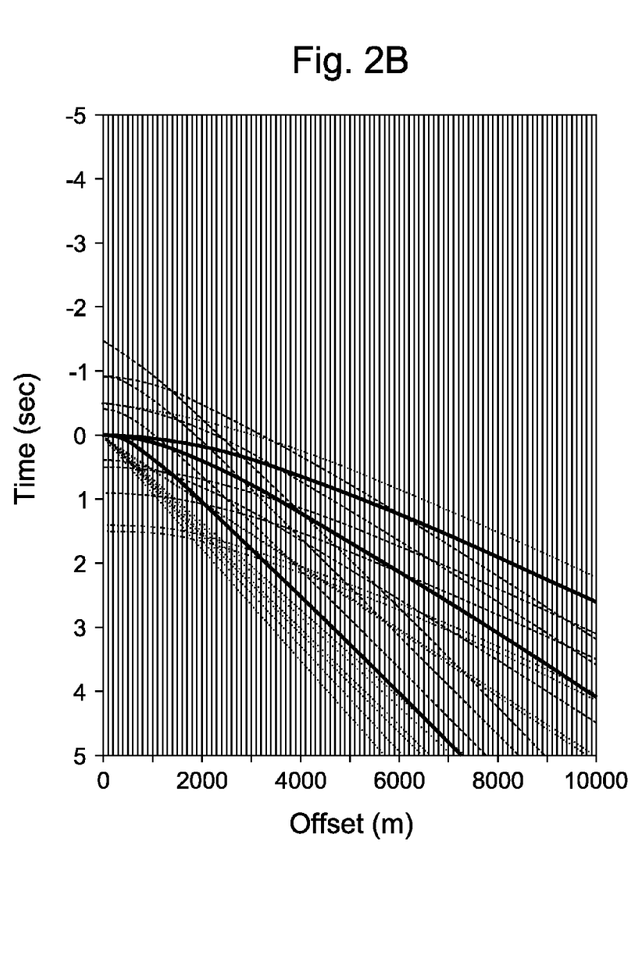

Thus, the traveltime information of the original data may still be encoded in the seismic interferograms such that moveout information may still be available in the seismic interferograms. FIG. 2B illustrates an ICMP gather where each vertical entry represents a seismic interferogram with an amplitude value at a given relative time and offset from the CMP. The ICMP gather illustrated in FIG. 2B shows the data from the CMP gather illustrated in FIG. 2A in the seismic interferogram domain.

At step 160, a semblance spectrum may be generated for each ICMP gather produced in step 140. A semblance spectrum may be a method of velocity analysis used to obtain the moveout velocity of events. The conventional use of semblance spectra for velocity analysis may be modified to be applied to seismic interferograms instead of seismograms, as described in FIG. 3 below. The result may be an improved semblance spectra technique with better unwanted signal suppression.

Figure 3:
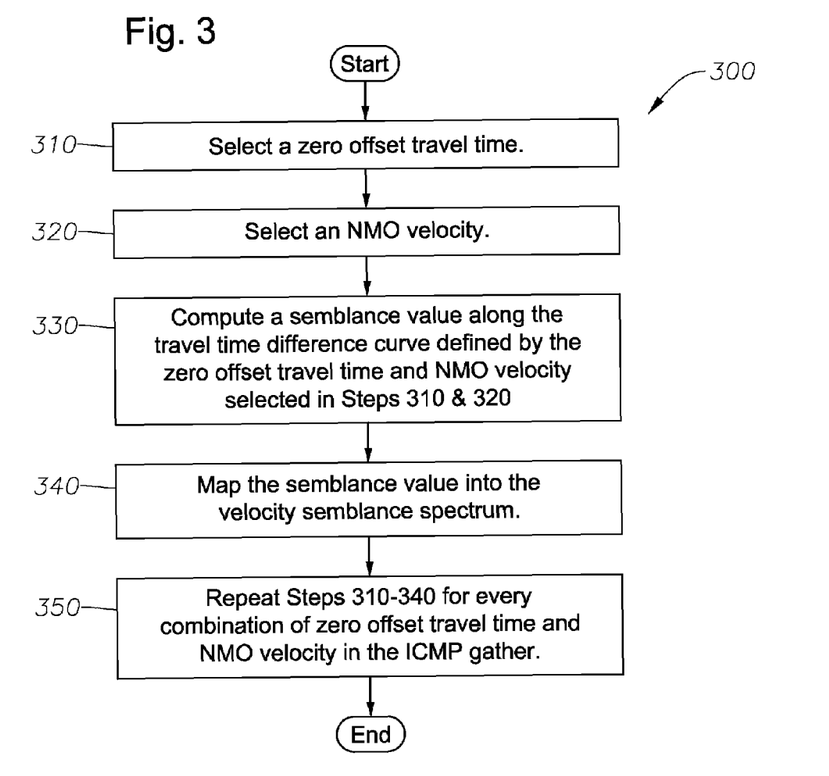
FIG. 3 illustrates a flow diagram of a method to generate a semblance spectrum using seismic interferograms in accordance with implementations of various technologies described herein.

FIG. 3 illustrates a flow diagram of a method 300 to generate a semblance spectrum using seismic interferograms in accordance with implementations of various technologies described herein. It should be understood that the operations illustrated in the flow diagram of FIG. 3 are not necessarily limited to being performed by method 300. Additionally, it should be understood that while the operational flow diagram indicates a particular order of execution of the operations, in other implementations, the operations might be executed in a different order.

At step 310, a zero offset traveltime may be selected. Each ICMP gather may have a minimum and maximum zero offset value. Any zero offset traveltime within the minimum and maximum range may be selected. At step 320, an NMO velocity may be selected. Each ICMP gather may have a minimum and maximum NMO velocity. Any NMO velocity within the minimum and maximum range may be selected.

At step 330, a semblance value may be computed along the traveltime difference curve defined by the selected zero offset traveltime and NMO velocity. In conventional semblance value calculations using seismograms may use the following equation:

$$t(h) = \sqrt{t_0^2 + \frac{h^2}{v^2}}$$ Equation 5

In Equation 5, $t_0$ represents the zero offset traveltime, v represents the NMO velocity and h represents the offset from the CMP. Because traveltime in seismic interferograms may be represented as the traveltime difference of Equation 4, Equation 5 may be modified for use in the seismic interferogram domain as shown below.

$$\tau(h) = t(h) - t(h_{ref}) = \sqrt{t_0^2 + \frac{h^2}{v^2}} - \sqrt{t_0^2 + \frac{h_{ref}^2}{v^2}}$$ Equation 6

Because the zero offset traveltime to and the NMO velocity v have been selected and the offset h and reference offset $h_{ref}$ define the seismic interferogram and are therefore known, Equation 5 may be calculated to obtain a semblance value.

Figure 2C:
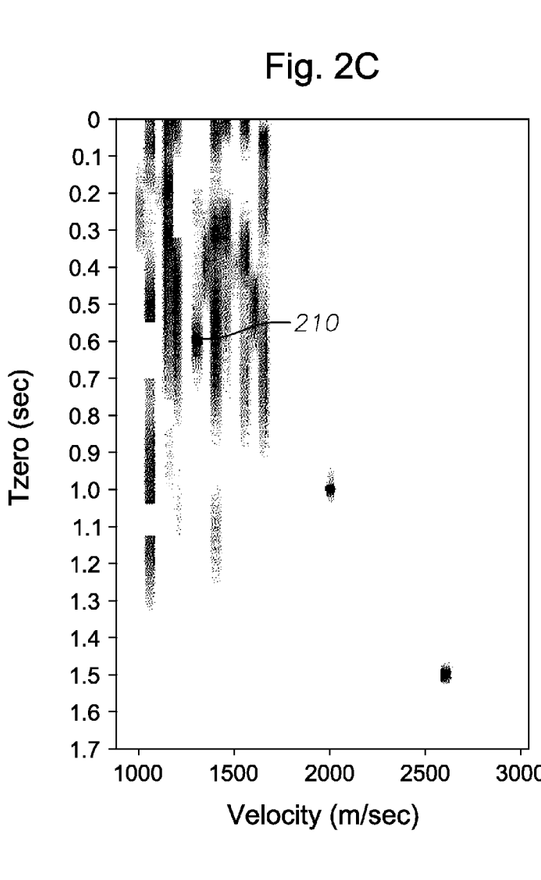

At step 340, the semblance value from step 330 may be mapped into the semblance spectrum. The semblance spectrum may be a matrix with the zero offset traveltime along one axis and the NMO velocity on the other axis. Semblance values of substantially one may be recorded as events, while semblance values of substantially zero may be recorded as non-events. FIG. 2C illustrates a typical semblance spectrum calculated from the data in FIG. 2A. In FIG. 2C, semblance values of substantially one may be recorded as black, while semblance values of substantially zero may be depicted by white. Dot patterns with increasing density represent values approaching one.

Figure 2D:
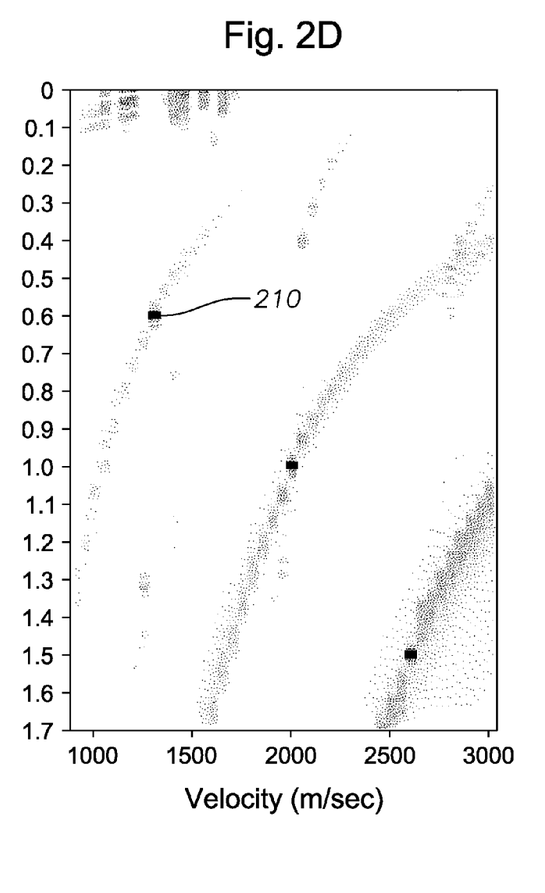

At step 350, steps 310-340 may be repeated for every combination of zero offset traveltime and NMO velocity for the ICMP gather. FIG. 2D illustrates the semblance spectrum that may be computed from the ICMP gather of FIG. 2B. FIGS. 2A and 2B illustrate the same seismic data in the seismogram and seismic interferogram domains respectively. Consequently, FIGS. 2C and 2D also represent the same seismic data. In the conventional semblance spectrum of FIG. 2C, a first event 210 at 0.6 seconds may be obscured by unwanted signals in the seismogram. However, in the semblance spectrum of FIG. 2D calculated from seismic interferograms, the unwanted signal may be substantially suppressed, increasing the signal-to-noise ratio and isolating the first event 210 at 0.6 seconds.

Returning to the flow diagram of FIG. 1, in one implementation, the semblance spectra generated in steps 110-160 may be used in any conventional manner, such as NMO corrections before stacking, dip moveout corrections and the like.

Referring now to step 170, one or more semblance spectra produced in step 160 may be stacked to produce a combined semblance spectrum. Stacking may be accomplished by summing the corresponding semblance values and dividing the sum by the number of values summed. In one implementation, the resulting combined semblance spectrum may be used in any conventional manner, such as the various methods described in the above paragraph with reference to the combined semblance spectrum.

At step 180, an NMO velocity profile may be derived by interpreting the combined semblance spectrum of step 170 by conventional methods. An NMO velocity profile may be used to prescribe corrections necessary to align events before seismic data may be stacked. As described above, seismograms in a CMP gather have the same CMP and the same reflection event below the earth's surface. A reflection typically arrives first at the receiver nearest the source. The offset between the source and other receivers induces a delay in the arrival time of a reflection event. Therefore, a reflection event may be recorded in a plurality of seismograms with delays in reflection arrival times. The effect of the separation between receiver and source on the arrival time of a reflection event may be referred to as normal moveout. The NMO velocity may define the moveout curvature. The NMO velocity profile may then be utilized for any conventional processing methods.

Figure 4A:
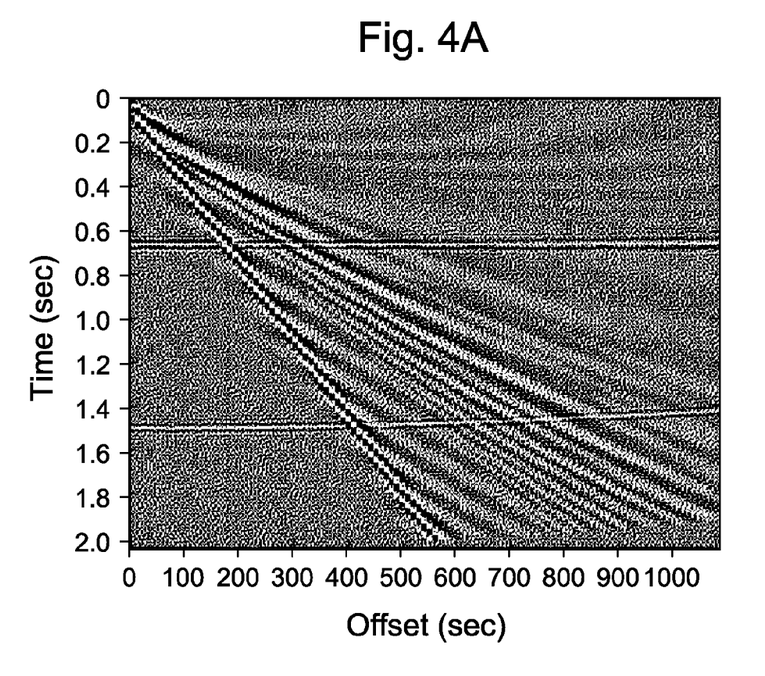
FIGS. 4A-D illustrate NMO correction and stacking using seismograms and seismic interferograms in accordance with implementations of various technologies described herein.
Figure 4B:
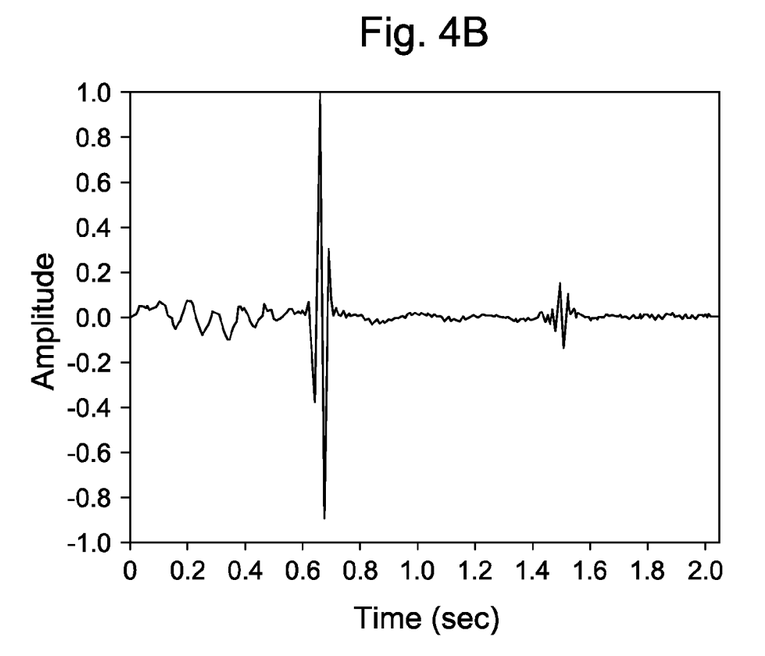

In one implementation, referring to step 190A, the NMO velocity profile of step 180 may be used to perform NMO stacking of the original seismograms of the CMP gather of step 110. The NMO velocity profile may be used to correct the seismograms of the CMP gather. The seismograms of the CMP gather may then be stacked to produce an approximation to the non-acquirable zero offset seismogram. The CMP gather may be corrected separately for each seismic event such that a single CMP gather may produce many NMO corrected stacks. For example, FIG. 4A illustrates an NMO corrected CMP gather where each vertical entry represents a seismogram with an amplitude value at a given time and offset from the CMP. FIG. 4B illustrates a stack of NMO corrected seismograms corrected for an event at 0.7 seconds. Note that while the event at 0.7 seconds may be amplified, it may still contain unwanted signals as well as reflection signal. A second event at 1.5 seconds was not the focus of the correction, yet may appear in FIG. 4B as unwanted signal.

Figure 5:
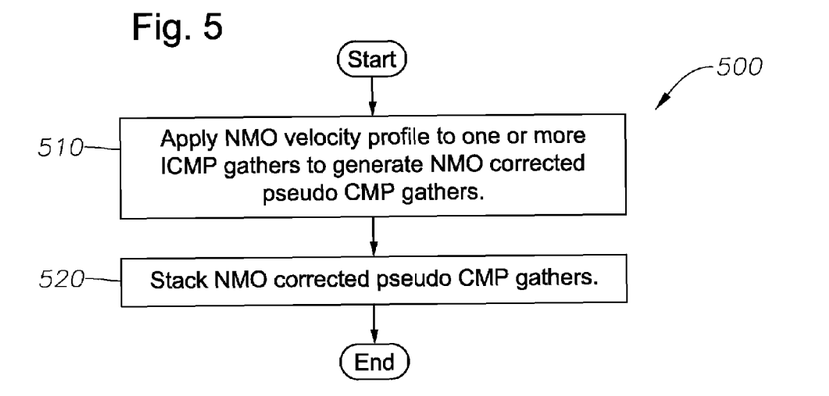
FIG. 5 illustrates a flow diagram of a method to generate NMO stacks using seismic interferograms in accordance with implementations of various technologies described herein.

In another implementation, referring to step 190B, the NMO velocity profile of step 180 may be used to generate NMO stacks using the seismic interferograms of step 150. FIG. 5 illustrates a flow diagram of a method 500 to generate NMO stacks using seismic interferograms in accordance with implementations of various technologies described herein. It should be understood that the operations illustrated in the flow diagram of FIG. 5 are not necessarily limited to being performed by method 500. Additionally, it should be understood that while the operational flow diagram indicates a particular order of execution of the operations, in other implementations, the operations might be executed in a different order.

At step 510, one or more ICMP gathers may be NMO corrected using an NMO velocity profile. Once they are NMO corrected, the ICMP gathers may be referred to as pseudo CMP gathers because they may be made up of a plurality of pseudo seismograms. Pseudo seismograms may refer to seismic data presented as a seismogram, with amplitude measured against time, but derived from seismic interferograms. Pseudo seismograms may be produced from seismic interferograms and an NMO velocity profile using the following equation:

$$t' = \sqrt{t_0^2 + \frac{h^2}{v(t_0)^2}} - \sqrt{t_0^2 + \frac{h_{ref}^2}{v(t_0)^2}}.$$  Equation 7

Figure 4C:
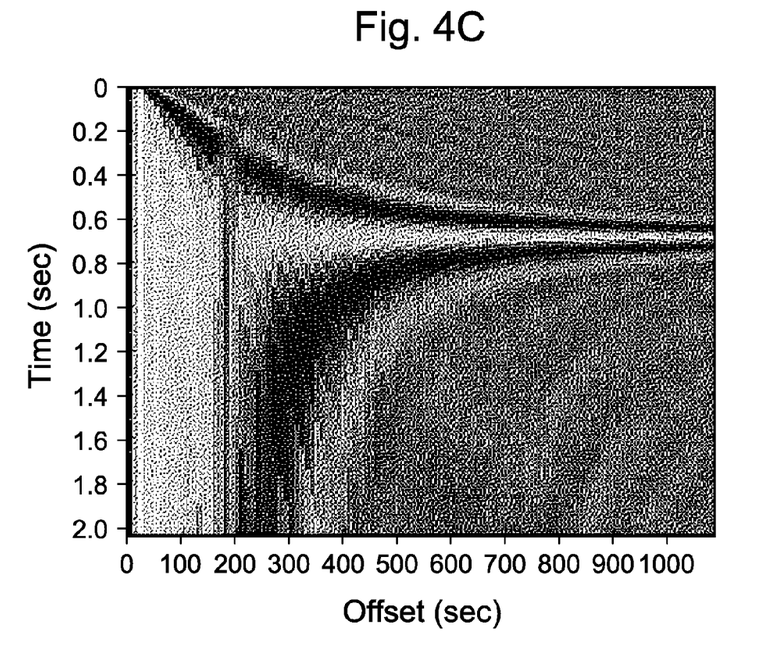

In Equation 7, $v(t_0)$ represents the NMO velocity, $t_0$ represents the zero offset traveltime, and h and $h_{ref}$ are known offsets identifying the seismic interferogram. Using Equation 7, a pseudo seismogram with two-way traveltime may be generated. FIG. 4C illustrates an NMO corrected pseudo CMP gather of pseudo seismograms corrected for the event occurring at 0.7 seconds, where each vertical entry represents a pseudo seismogram with an amplitude value at a given time and offset. FIG. 4C represents the pseudo CMP gather of the CMP data used in FIG. 4A.

Figure 4D:
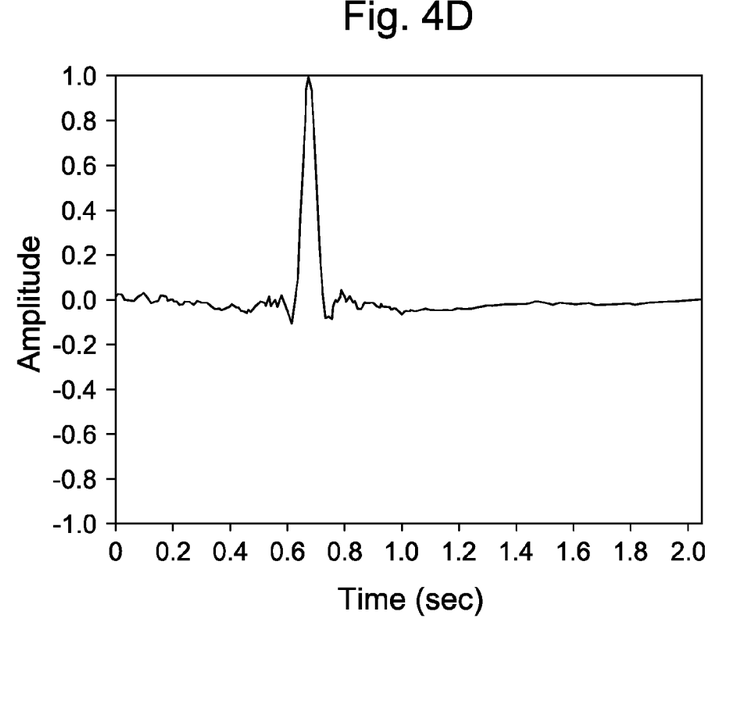

At step 520, each NMO corrected pseudo CMP gather may be stacked to generate the equivalent of a normal-moveout stack of the original seismograms. FIG. 4D illustrates a stack of an NMO corrected pseudo CMP gather. FIG. 4D represents the NMO stack of a pseudo CMP gather of the same data used with reference to FIG. 4B. Note that unwanted signal may be better attenuated by NMO stacking of pseudo CMP gathers (as illustrated in FIG. 4D) than by conventional NMO stacking of CMP gathers (as illustrated in FIG. 4B). Each ICMP gather may generate a pseudo CMP gather that may be stacked. Such stack of pseudo CMP gather may be further stacked to produce the equivalent of a conventional CMP stack from the same data.

In one implementation, method 500 may be used to generate NMO stacks from seismic interferograms without first computing a semblance spectrum from seismic interferograms. In this implementation, following step 150, as an alternative to proceeding to step 160, step 190B may be performed using an NMO velocity profile derived by any method such as computing a semblance spectrum in the seismogram domain.

Returning to the flow diagram of FIG. 1, in one implementation, the NMO stacks produced from ICMP gathers in step 190B may be used in any conventional manner, such as improving signal to noise ratio, improving the seismic image and the like. As mentioned above, the NMO stacks produced from the ICMP gathers may be further stacked to produce the equivalent of a conventional CMP stack.

Figure 6:
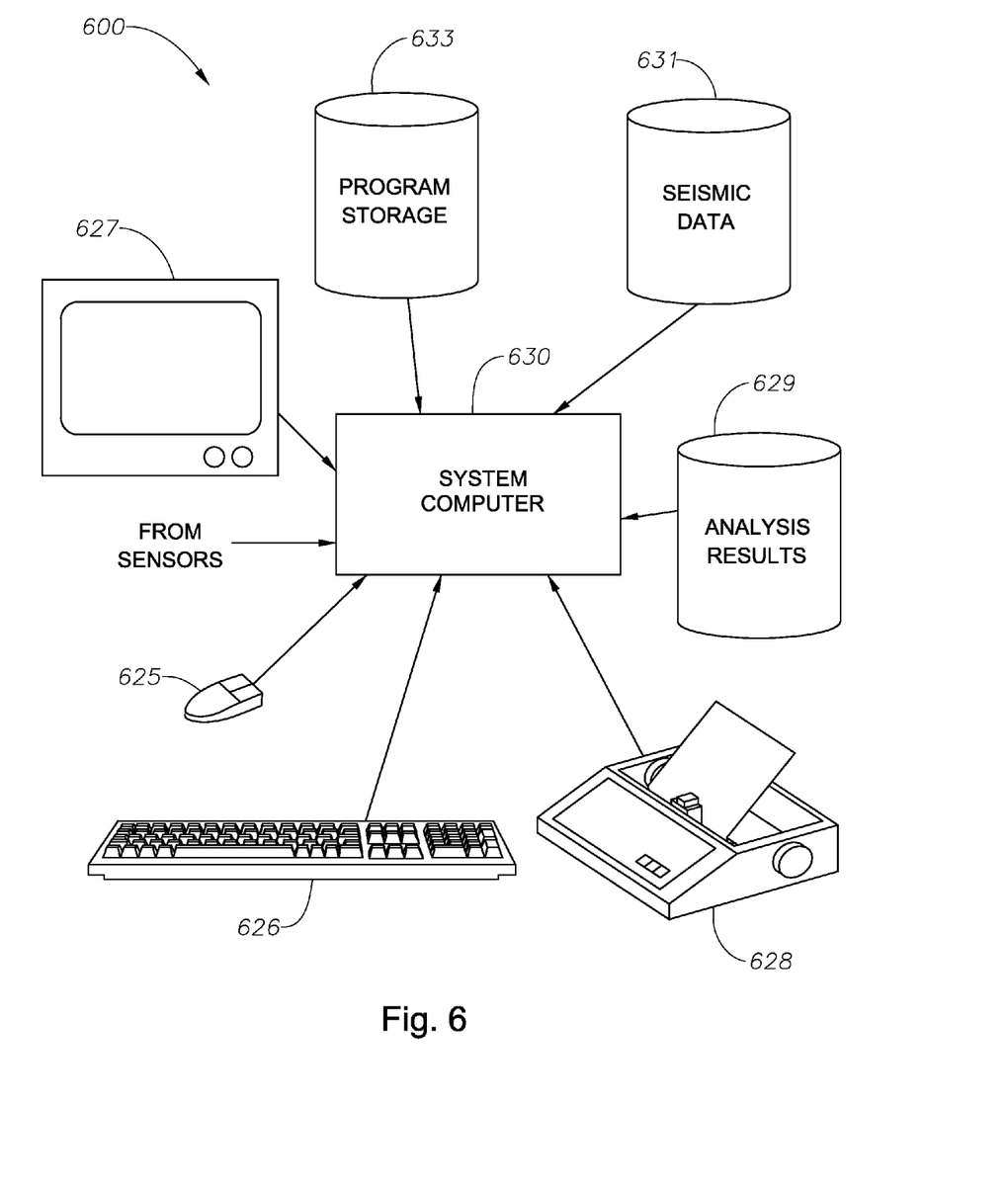
FIG. 6 illustrates a computer network, into which implementations of various technologies described herein may be implemented.

FIG. 6 illustrates a computer network 600, into which implementations of various technologies described herein may be implemented. The computer network 600 may include a system computer 630, which may be implemented as any conventional personal computer or server. However, those skilled in the art will appreciate that implementations of various technologies described herein may be practiced in other computer system configurations, including hypertext transfer protocol (HTTP) servers, hand-held devices, multi-processor systems, microprocessor-based or programmable consumer electronics, network PCs, minicomputers, mainframe computers, and the like.

The system computer 630 may be in communication with disk storage devices 629, 631, and 633, which may be external hard disk storage devices. It is contemplated that disk storage devices 629, 631, and 633 are conventional hard disk drives, and as such, will be implemented by way of a local area network or by remote access. Of course, while disk storage devices 629, 631, and 633 are illustrated as separate devices, a single disk storage device may be used to store any and all of the program instructions, measurement data, and results as desired.

In one implementation, seismic data from the receivers may be stored in disk storage device 631. The system computer 630 may retrieve the appropriate data from the disk storage device 631 to process seismic data according to program instructions that correspond to implementations of various technologies described herein. The program instructions may be written in a computer programming language, such as C++, Java and the like. The program instructions may be stored in a computer-readable medium, such as program disk storage device 633. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 630 may present output primarily onto graphics display 627, or alternatively via printer 628. The system computer 630 may store the results of the methods described above on disk storage 629, for later use and further analysis. The keyboard 626 and the pointing device (e.g., a mouse, trackball, or the like) 625 may be provided with the system computer 630 to enable interactive operation.

The system computer 630 may be located at a data center remote from the survey region. The system computer 630 may be in communication with the receivers (either directly or via a recording unit, not shown), to receive signals indicative of the reflected seismic energy. These signals, after conventional formatting and other initial processing, may be stored by the system computer 630 as digital data in the disk storage 631 for subsequent retrieval and processing in the manner described above. While FIG. 6 illustrates the disk storage 631 as directly connected to the system computer 630, it is also contemplated that the disk storage device 631 may be accessible through a local area network or by remote access. Furthermore, while disk storage devices 629, 631 are illustrated as separate devices for storing input seismic data and analysis results, the disk storage devices 629, 631 may be implemented within a single disk drive (either together with or separately from program disk storage device 633), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
converting a common midpoint (CMP) gather of seismograms into one or more interferogram common midpoint (ICMP) gathers;
generating a semblance spectrum for each ICMP gather;
stacking the semblance spectrum from each ICMP gather to generate a combined semblance spectrum; and
deriving a normal moveout (NMO) velocity profile from the combined semblance spectrum.

2. The method of claim 1, further comprising generating NMO stacks of seismic data using the NMO velocity profile.

3. The method of claim 2, wherein generating the NMO stacks comprises:
correcting one or more seismograms of the CMP gather using the NMO velocity profile; and
stacking the corrected seismograms to generate an approximation of a zero offset seismogram.

4. The method of claim 3, wherein generating the NMO stacks comprises correcting the CMP gather for each seismic event.

5. The method of claim 2, wherein the NMO stacks are generated from the CMP gather.

6. The method of claim 2, wherein the NMO stacks are generated from the ICMP gathers.

7. The method of claim 2, wherein generating the NMO stacks comprises:
correcting the ICMP gathers using the NMO velocity profile; and
stacking the NMO corrected ICMP gathers.

8. The method of claim 1, wherein converting the CMP gather into the ICMP gathers comprises:
selecting one or more seismograms as reference seismograms; and
deconvolving each seismogram in the CMP gather with each reference seismogram.

9. The method of claim 1, wherein converting the CMP gather into the ICMP gathers comprises:
selecting one or more seismograms as reference seismograms;
applying a Fourier transform to each seismogram;
deconvolving each seismogram in the CMP gather with each reference seismogram to generate the ICMP gathers; and
applying an inverse Fourier transform to each seismic interferogram in each ICMP gather.

10. The method of claim 1, wherein generating the semblance spectrum for each ICMP gather comprises:
selecting a zero offset traveltime corresponding to an ICMP gather;
selecting an NMO velocity corresponding to the ICMP gather;
computing a semblance value along a traveltime difference curve defined by the selected zero offset traveltime and the selected NMO velocity; and
mapping the semblance value onto a semblance spectrum for the ICMP gather.

11. A computer system, comprising:
a processor; and
a memory comprising program instructions executable by the processor to:
prepare one or more seismograms into a common midpoint (CMP) gather;
convert the CMP gather into one or more interferogram common midpoint (ICMP) gathers;
generate a semblance spectrum for each ICMP gather;
stack a semblance spectra from the one or more ICMP gathers to generate a combined semblance spectrum;
derive a normal moveout (NMO) velocity profile from the combined semblance spectrum; and
generate NMO stacks of seismic data using the NMO velocity profile.

12. The computer system of claim 11, wherein the memory comprising program instructions executable by the processor to generate NMO stacks of seismic data comprises program instructions executable by the processor to:
correct the seismograms of the CMP gather using the NMO velocity profile; and
stack the corrected seismograms to generate an approximation of a zero offset seismogram.

13. The computer system of claim 11, wherein the memory comprising program instructions executable by the processor to generate NMO stacks of seismic data comprises program instructions executable by the processor to:
correct the ICMP gathers using the NMO velocity profile; and
stack the NMO corrected ICMP gathers.

14. The computer system of claim 11, wherein the memory comprising program instructions executable by the processor to convert the CMP gather into the ICMP gathers comprises program instructions executable by the processor to:
select one or more seismograms as reference seismograms; and
deconvolve each seismogram in the CMP gather with each reference seismogram.

15. The computer system of claim 11, wherein the memory comprising program instructions executable by the processor to generate the semblance spectrum for each ICMP gather comprises program instructions executable by the processor to:
select a zero offset traveltime corresponding to an ICMP gather;
select an NMO velocity corresponding to the ICMP gather;
compute a semblance value along a traveltime difference curve defined by the selected zero offset traveltime and the selected NMO velocity; and
map the semblance value onto a semblance spectrum for the ICMP gather.

* * * * *